United States Patent
Kahler et al.

(10) Patent No.: US 10,926,508 B2
(45) Date of Patent: Feb. 23, 2021

(54) PLASTIC TANK

(71) Applicant: MAGNA STEYR Fuel Systems GesmbH, Sinabelkirchen (AT)

(72) Inventors: Bernd Kahler, Graz (AT); Rainer Puchleitner, Graz (AT); Harald Humenberger, St. Ruprecht (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 289 days.

(21) Appl. No.: 16/137,401

(22) Filed: Sep. 20, 2018

(65) Prior Publication Data
US 2019/0091978 A1    Mar. 28, 2019

(30) Foreign Application Priority Data

Sep. 26, 2017  (EP) ..................... 17193121

(51) Int. Cl.
  *B32B 1/02*  (2006.01)
  *B65D 1/02*  (2006.01)
  (Continued)

(52) U.S. Cl.
  CPC .............. *B32B 1/02* (2013.01); *B29C 49/04* (2013.01); *B32B 7/12* (2013.01); *B32B 27/08* (2013.01); *B32B 27/20* (2013.01); *B32B 27/30* (2013.01); *B32B 27/302* (2013.01); *B32B 27/306* (2013.01); *B32B 27/32* (2013.01); *B32B 37/12* (2013.01); *B60K 15/03* (2013.01); *B60K 15/03177* (2013.01); *B65D 1/0215* (2013.01); *B65D 1/0223* (2013.01); *B65D 1/28* (2013.01);
  (Continued)

(58) Field of Classification Search
  CPC ...... B65D 1/02; B65D 1/0207; B65D 1/0215; B65D 1/0223; B65D 1/28; B65D 1/42; B32B 1/00; B32B 1/02; B32B 27/30; B32B 27/302; B32B 27/34; Y10T 428/1352; Y10T 428/1372; Y10T 428/1379; Y10T 428/1383
  See application file for complete search history.

(56) References Cited

U.S. PATENT DOCUMENTS

| 6,589,620 B1 * | 7/2003 | Abu-Isa | B32B 27/08 428/36.6 |
| 2003/0198768 A1 * | 10/2003 | Delbarre | C08L 23/10 428/36.6 |

(Continued)

FOREIGN PATENT DOCUMENTS

| DE | 102010046378 A1 | 3/2012 |
| EP | 1122113 A1 | 8/2001 |

(Continued)

*Primary Examiner* — Walter Aughenbaugh
(74) *Attorney, Agent, or Firm* — Jordan IP Law, LLC; Todd A. Vaughn

(57) ABSTRACT

A plastic tank for a motor vehicle and a method for producing such a plastic tank for a motor vehicle. The tank shell has a multi-layered structure, including at least one layer composed of high-density polyethylene, at least one barrier layer, and at least one regrind layer composed of recycled plastic arranged between the at least one layer composed of high-density polyethylene and the at least one barrier layer. The at least one regrind layer and/or the at least one layer composed of high-density polyethylene contains spherical fillers or fibrous fillers.

4 Claims, 1 Drawing Sheet

(51) Int. Cl.
*B60K 15/03* (2006.01)
*B29C 49/04* (2006.01)
*B65D 1/28* (2006.01)
*B32B 27/30* (2006.01)
*B32B 7/12* (2006.01)
*B32B 27/08* (2006.01)
*B32B 27/20* (2006.01)
*B32B 27/32* (2006.01)
*B32B 37/12* (2006.01)

(52) U.S. Cl.
CPC ..... *B32B 2250/05* (2013.01); *B32B 2250/246* (2013.01); *B32B 2262/101* (2013.01); *B32B 2264/101* (2013.01); *B32B 2605/00* (2013.01); *B60K 2015/03046* (2013.01); *B60K 2015/03493* (2013.01); *Y10T 428/1352* (2015.01); *Y10T 428/1372* (2015.01); *Y10T 428/1379* (2015.01); *Y10T 428/1383* (2015.01)

(56) References Cited

U.S. PATENT DOCUMENTS

| | | |
|---|---|---|
| 2011/0151165 A1 | 6/2011 | Zhu et al. |
| 2011/0226777 A1 | 9/2011 | Asahara |
| 2012/0074028 A1* | 3/2012 | Martin ............... B32B 27/34 206/524.6 |

FOREIGN PATENT DOCUMENTS

| | | |
|---|---|---|
| EP | 1245381 A1 | 10/2002 |
| WO | 2004035295 A1 | 4/2004 |

* cited by examiner

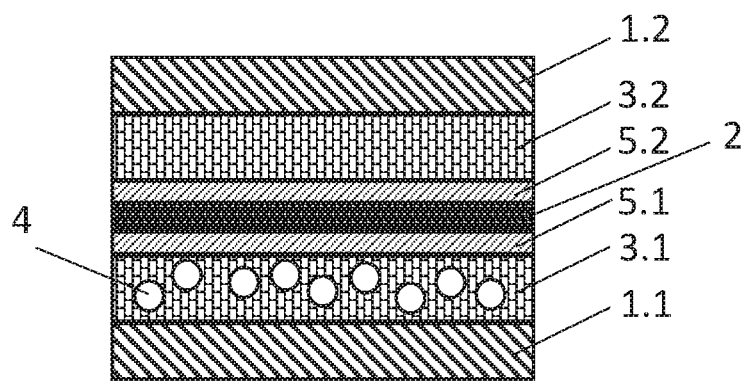

PLASTIC TANK

CROSS-REFERENCE TO RELATED APPLICATIONS

The present application claims priority to European Patent Publication No. EP17193121.5 (filed on Sep. 26, 2017), which is hereby incorporated by reference in its entirety.

TECHNICAL FIELD

Embodiments relate to a plastic tank for a motor vehicle and a method for producing such a plastic tank for a motor vehicle.

BACKGROUND

Plastic tanks for motor vehicles are presently frequently used as fuel tanks, i.e., to accommodate the fuel for operating the motor vehicle.

Since such plastic tanks have to meet various mechanical and chemical requirements, equipping plastic tanks with tank shells, which consist of multiple layers of various materials, is already known. In particular, for example, a barrier layer can be used to reduce the passage of hydrocarbons. Such a barrier layer can be formed, for example, as an inner layer of a tank shell and can be composed of ethylene vinyl alcohol copolymer (EVOH).

It is also already known that plastic can be used not only in newly produced, primary form, but rather also, for example, in reprocessed recycled form, as so-called "regrind." In this case, plastic wastes and/or plastic residues, which are often provided in the form of a mixture of various plastics, are ground into a ground material, the regrind, and supplied in this granular form to a further processing process, in particular, a production process.

The use of such regrinds is also desirable from an ecological viewpoint for plastic tanks of the above-described type, but tank shells composed of regrind can hardly have the properties required for a fuel tank in a motor vehicle, in particular, with respect to pressure and temperature stability.

SUMMARY

Embodiments relate to an enhanced structure for a plastic tank for a motor vehicle and, a corresponding method for producing such a plastic tank.

Embodiments relate to such a plastic tank that has good mechanical and chemical properties and, at the same time, may be produced ecologically and economically.

In accordance with embodiments, a plastic tank for a motor vehicle, may comprise a tank shell having a multi-layered structure including a plurality of layers that include at least one layer composed of high-density polyethylene (HDPE), at least one barrier layer, and at least one regrind layer, wherein the regrind layer and/or the HDPE layer contains spherical or fibrous fillers.

In accordance with embodiments, a plastic tank may be constructed having a plurality of layers, wherein the base of the tank and the production method is substantially high-density polyethylene, i.e., HDPE. In addition to a barrier layer for hydrocarbons, a regrind layer is used, i.e., a layer composed of a recycled plastic, in particular, a plastic mixture which has been ground to form a plastic granulate, and in this form, is processed into a layer of the tank shell of the plastic tank.

In accordance with embodiments, in order to achieve the required mechanical stability of the tank shell in spite of properties of the regrind which are modestly suitable per se, a regrind having spherical or fibrous fillers may be used. Alternatively or additionally, spherical or fibrous fillers may also be added to the primary HDPE layer in order to achieve the desired mechanical properties for the overall layer structure of the tank shell. In particular, the regrind may be produced from production residues of the same multi-layered plastic tank. For example, the regrind may therefore comprise a high proportion of HDPE, and may in itself be obtained from regrind in addition to the primary HDPE, and the regrind can comprise EVOH from a barrier layer. The regrind layer may be produced from a regrind material, i.e., from a recycled plastic granulate.

In accordance with embodiments, the tank shell may comprise, from the inside to the outside: a layer composed of HDPE, a regrind layer, a barrier layer, a further regrind layer, a further layer composed of HDPE. In this case, the further regrind layer preferably, like the regrind layer, contains spherical or fibrous fillers. Alternatively or additionally, the further HDPE layer can also contain spherical or fibrous fillers. Such fillers may, for example, comprise glass beads, perlite, and/or glass fibres.

In accordance with embodiments, the barrier layer may be connected to the regrind layer via an intervening adhesion promoter layer. If a further regrind layer is provided, it may also be connected to the barrier layer via an adhesion promoter layer.

In accordance with embodiments, a method for producing a plastic tank for a motor vehicle may comprise at least one of: selectively adding fillers in a targeted manner to a regrind material of the regrind layer. The fillers may be added to the regrind material before the processing to form a plastic tank. The fillers may be introduced exclusively into the regrind layer or into the regrind layers. The remaining layers of the plastic tank preferably do not have fillers.

In accordance with embodiments, the regrind layer may be produced with the aid of an extruder from a regrind material, i.e., from a recycled plastic granulate.

In accordance with embodiments, the fillers may be admixed to the regrind material before the extrusion and subsequently the regrind material, already comprising the fillers, is supplied to the extruder.

In accordance with embodiments, during the extrusion, the fillers may be supplied to the regrind material through a channel of the extruder, in particular, a color channel.

DRAWINGS

Embodiments will be illustrated by way of example in the drawings and explained in the description below.

FIG. 1 illustrates a schematic sectional view of a tank shell of a plastic tank for a motor vehicle, in accordance with embodiments.

DESCRIPTION

As illustrated in FIG. 1, a plastic tank for a motor vehicle is provided having a multi-layered structure. The tank shell of the plastic tank has a plurality of layers, including from the inside (shown on the bottom of FIG. 1) to the outside (shown on the top of FIG. 1), an outermost layer 1.1 composed of HDPE, a first intermediary layer 3.1 composed of a regrind material, a first adhesion promoter layer 5.1, a barrier layer 2 composed of EVOH, a second adhesion promoter layer 5.2, a second intermediary layer 3.2 composed of a regrind material, and an innermost layer 1.2 composed of HDPE.

In accordance with embodiments, the first regrind layer 3.1 contains spherical or fibrous fillers 4, for example, glass beads, perlite, and/or glass fibres. The second regrind layer 3.2 may also contain such fibrous fillers 4. One or both of the HDPE layers 1.1, 1.2 may also contain the same fibrous fillers 4. Alternatively, the first regrind layer 3.1 and the second regrind layer 3.2 may exclusively contain spherical or fibrous fillers 4 such that the remaining layers of the plastic tank do not contain fibrous fillers.

In accordance with embodiments, the proportion of the fibrous fillers 4 in a layer, such as, for example, the first regrind layer 3.1 and the second regrind layer 3.2, may be between 1% and 80%, and particularly, between 10% to 50%.

In accordance with embodiments, the layer thicknesses may be allocated as follows: the first HDPE layer 1.1 and the second HDPE layer 1.2 may each occupy approximately 22% of the overall tank shell thickness, the first regrind layer 3.1 and the second regrind layer 3.2 may each occupy approximately 25% of the overall tank shell thickness, the barrier layer 2 may occupy approximately 3% of the overall tank shell thickness, and the first adhesion promoter layer 5.1 and the second adhesion promoter layer 5.2 may each approximately 1.5% of the overall tank shell thickness.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1.1 Inner HDPE layer
1.2 Outer HDPE layer
2 Barrier layer
3.1 First regrind layer
3.2 Second regrind layer
4 Fillers
5.1 First adhesion promoter layer
5.2 Second adhesion promoter layer

What is claimed is:

1. A tank for a motor vehicle, the tank comprising, a multi-layered structure that includes:
   an outermost layer composed of high-density polyethylene;
   an innermost layer composed of high-density polyethylene;
   a first regrind layer composed of recycled plastic arranged on the outermost layer;
   a second regrind layer composed of recycled plastic arranged on the innermost layer; and
   a barrier layer arranged between the first regrind layer and the second regrind layer,
   wherein the first regrind layer contains spherical fillers or fibrous fillers and the second regrind layer contains spherical fillers or fibrous fillers.

2. The tank of claim 1, further comprising a first adhesion promoter layer to connect the barrier layer to the first regrind layer.

3. The tank of claim 2, further comprising a second adhesion promoter layer to connect the barrier layer to the second regrind layer.

4. The tank of claim 1, wherein the barrier layer is composed of ethylene vinyl alcohol copolymer.

* * * * *